US010391550B2

(12) United States Patent
Peters et al.

(10) Patent No.: US 10,391,550 B2
(45) Date of Patent: Aug. 27, 2019

(54) METHODS AND APPARATUS FOR ACTUATED FABRICATOR

(71) Applicant: Massachusetts Institute of Technology, Cambridge, MA (US)

(72) Inventors: Benjamin Peters, Somerville, MA (US); Neri Oxman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 189 days.

(21) Appl. No.: 15/683,520

(22) Filed: Aug. 22, 2017

(65) Prior Publication Data

US 2018/0001375 A1    Jan. 4, 2018

Related U.S. Application Data

(63) Continuation of application No. 13/856,698, filed on Apr. 4, 2013, now Pat. No. 9,764,378.
(Continued)

(51) Int. Cl.
| | | |
|---|---|---|
| *B22D 11/01* | (2006.01) | |
| *B29C 64/147* | (2017.01) | |
| *B29C 64/112* | (2017.01) | |
| *B29C 70/52* | (2006.01) | |
| *B33Y 10/00* | (2015.01) | |
| *B33Y 30/00* | (2015.01) | |
| *B33Y 40/00* | (2015.01) | |
| *B22D 11/12* | (2006.01) | |

(Continued)

(52) U.S. Cl.
CPC .......... *B22D 11/01* (2013.01); *B22D 11/1206* (2013.01); *B22D 11/14* (2013.01); *B29C 64/106* (2017.08); *B29C 64/112* (2017.08); *B29C 64/141* (2017.08); *B29C 64/147* (2017.08); *B29C 70/52* (2013.01); *B32B 37/12* (2013.01); *B32B 38/10* (2013.01); *B33Y 10/00* (2014.12); *B33Y 30/00* (2014.12); *B33Y 40/00* (2014.12)

(58) Field of Classification Search
CPC ..... B29C 70/52; B29C 64/112; B29C 64/106; B29C 64/141; B29C 64/147; B33Y 10/00; B33Y 30/00; B33Y 40/00; B22D 11/01; B22D 11/1206; B22D 11/14; B32B 37/12; B32B 38/10
See application file for complete search history.

(56) References Cited

U.S. PATENT DOCUMENTS

| | | | |
|---|---|---|---|
| 3,752,724 A | 8/1973 | Seiler | |
| 4,386,485 A * | 6/1983 | Kramer | .......... E04H 12/185 52/108 |

(Continued)

*Primary Examiner* — Vishal I Patel
(74) *Attorney, Agent, or Firm* — Stephen R. Otis

(57) ABSTRACT

In exemplary implementations of this invention, an actuated fabricator deposits structural elements (e.g., tensile structural elements) in a 3D pattern over large displacements. The fabricator is supported by at least three elongated support members. It includes onboard actuators that translate the fabricator relative to the ends of the support members. The fabricator is configured, by actuating different translations along different support members, to translate itself throughout a 3D volume. In some implementations, each of the actuators use fusible material to fuse metal tapes together, edge-to-edge, to form a hollow structure that can be shortened or lengthened.

20 Claims, 16 Drawing Sheets

Related U.S. Application Data

(60) Provisional application No. 61/620,314, filed on Apr. 4, 2012.

(51) Int. Cl.
*B22D 11/14* (2006.01)
*B29C 64/106* (2017.01)
*B29C 64/141* (2017.01)
*B32B 37/12* (2006.01)
*B32B 38/10* (2006.01)

(56) References Cited

U.S. PATENT DOCUMENTS

| | | |
|---|---|---|
| 4,875,660 A | 10/1989 | Gagnon et al. |
| 6,112,474 A * | 9/2000 | Paine .................... E04H 12/185 242/390.2 |
| 6,547,216 B1 | 4/2003 | Bouchard et al. |
| 7,213,796 B2 | 5/2007 | Laforest |
| 2006/0261207 A1 * | 11/2006 | Woodruff ............. E04H 12/185 242/473.3 |
| 2011/0126650 A1 | 6/2011 | Sorensen et al. |

\* cited by examiner

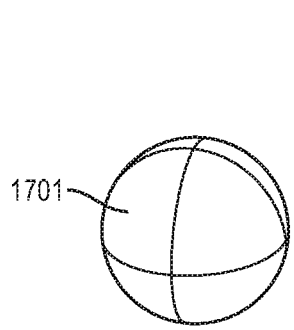
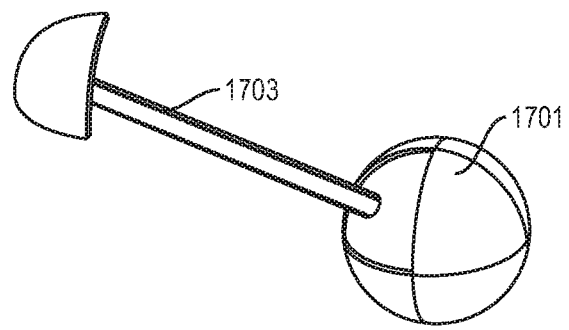
FIG. 17A  FIG. 17B
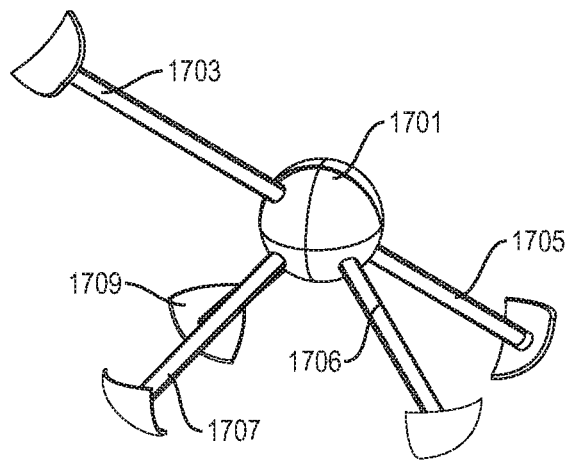
FIG. 17C
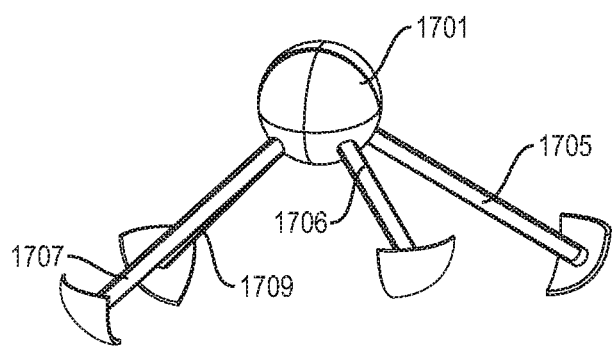
FIG. 17D

METHODS AND APPARATUS FOR ACTUATED FABRICATOR

RELATED APPLICATIONS

This application is a continuation of U.S. application Ser. No. 13/856,958, filed on Apr. 4, 2013, which claims the benefit of U.S. Provisional Application No. 61/620,314, filed Apr. 4, 2012 ("the Provisional Application"). The entire disclosure of the Provisional Application is incorporated by reference herein.

STATEMENT REGARDING FEDERALLY SPONSORED RESEARCH OR DEVELOPMENT

This invention was made with U.S. government support under Grant Number CMMI-1152550, awarded by the National Science Foundation. The government has certain rights in this invention.

FIELD OF THE TECHNOLOGY

The present invention relates generally to fabrication and to actuation.

SUMMARY

In exemplary implementations of this invention, an actuated fabricator deposits structural elements in a 3D pattern over large displacements. The fabricator may be used to 3D print a large structure, such as a house.

In some cases, the fabricator deposits tensile structural elements. The tensile elements may be used for creating a tensile structure. For example, the tensile structure may comprise a web, net, cocoon, suspension bridge, cable-stayed truss, cable, tensegrity, or tensairity structure.

The fabricator is supported by at least three elongated support members. It includes onboard actuators that translate the fabricator relative to the ends of the support members. The fabricator can, by actuating different translations along different support members, translate itself throughout a 3D working volume.

For example, in some implementations, the support elements are cables and the onboard actuators are winch motors that wind or unwind the cables. In other implementations, the actuators use fusible material to fuse metal tapes together, edge-to-edge, to form a hollow structure that can be shortened or lengthened. The hollow structures can bear compressive loads.

In some implementations of this invention, the fabricator is "self-contained", in that it includes (i) onboard actuators, (ii) reservoirs or other storage devices for storing the material to be deposited (or ingredient(s) used in producing the deposited material onboard the fabricator), (iii) onboard power and (iv) electronics for control and data processing. A "self-contained" fabricator can be quickly and easily deployed at a construction site.

The description of the present invention in the Summary and Abstract sections hereof is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 9 shows rollers that are included in the actuator. The rollers include thermoelectric heat pumps for heating or cooling the fusible material.
FIG. 10 shows slots in the tapes. The edges of a rotatable screw are configured to engage the slots. As the screw rotates, the hollow structure increases or decreases in length, depending on the direction of rotation of the screw.
FIG. 11 shows a tall hollow structure produced by the actuator.
FIG. 12A shows an actuator with separate servo motors for each of the three tapes.
In FIG. 12B, the hollow structure is straight.
In FIG. 12C, the hollow structure is curved.
In FIG. 15, heat is being pumped in one direction.
In FIG. 16, the DC current passing through the cooler has been reversed, causing heat to be pumped in the reverse direction.
FIGS. 17A, 17B, 17C, 17D show a robot with linear actuators. The actuators can extend or retract rigid or semi-rigid elongated structural members ("arms").
In FIG. 17A, all of the arms are fully retracted.
In FIG. 17B, one of the arms is extended.
In FIG. 17C, the robot is supported by four of the arms, and is reaching out with a fifth arm.
In FIG. 17D, the robot is supported by three arms and has lifted a fourth arm from the ground.

Figure 1:
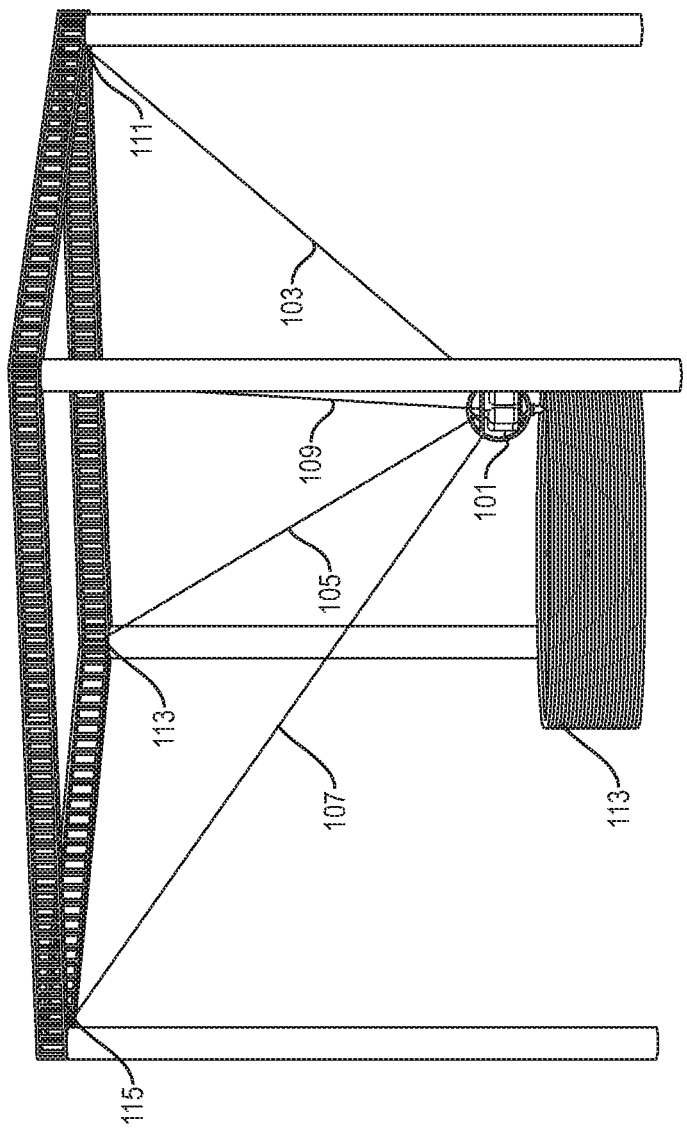
FIG. 1 shows a fabricator for depositing material.

The above Figures show some illustrative implementations of this invention, or provide information that relates to those implementations. However, this invention may be implemented in many other ways. The above Figures do not show all of the details of this invention.

DETAILED DESCRIPTION

In exemplary implementations of this invention, a robotic fabricator is configured to 3D print large structures, such as homes or office buildings. The fabricator includes an extrusion nozzle and a reservoir of material that may be extruded through the nozzle. The extruded material is used to help fabricate the structure being built.

The fabricator is configured to be translated to all points in a large 3D volume. For example, the 3D volume may be tens of meters in height, depth or width. These large displacements allow the fabricator to 3D print a large structure.

The fabricator may actuate its own motion throughout the 3D volume. For example, the fabricator may include onboard linear actuators. For example, the linear actuators may comprise actuated prismatic joints or pneumatic, hydraulic or electric linear actuators. The linear actuators may be collapsible.

Each linear actuator may be configured to shorten or extend the length of a rigid or semi-rigid elongated support element (an "arm"). By altering the lengths of respective arms that support the fabricator, the fabricator may move throughout the 3D volume. Each arm of the fabricator can move throughout a range of linear motion, including movement to fully retracted, partially extended or fully extended positions.

Alternately, the fabricator may include multiple onboard winching motors and may be supported by cables. The onboard motors are used to wind or unwind the cables, causing the fabricator to move to different positions along the cables. The cables may be connected to stable points high in the environment, such as large trees or previously constructed buildings.

In some cases, additional cables are added below or to the side of the fabricator and are used for positioning, rather than supporting, the fabricator. In cases where these additional cables are used, winching motors in the fabricator may tension all of the cables and then vary the length of the respective cables in order to precisely control the position of the fabricator. In order to prevent the additional cables from interfering with the structure being constructed by the fabricator, the points to which the additional cables are anchored may be raised as the structure being built increases in height.

In either case (linear actuator or cables), the fabricator is capable of moving large distances. The system is easy to setup for mobile projects but affords sufficient printing resolution and build volume.

Depending on the particular implementation of this invention, the fabricator may be supported by support elements that bear purely compressive, tensile or bending loads, or may bear a combination of any two or more of these types of loads. The number of onboard linear actuators may vary. In many implementations, four or more such actuators are preferable.

FIG. 1 shows a fabricator 101 for depositing material to 3D print a large structure 113. The fabricator 101 is supported by four cables 103, 105, 107, 109 attached to anchors (e.g., 111, 113, 115) high above the ground. The anchors may be attached to objects that are already in the area (such as trees or tall buildings). Alternately, as shown in FIG. 1, the anchors may be part of or attached to a temporary structure that can be transported to and assembled at the building site.

A variety of materials can be utilized to 3D print elements of the structure that is being fabricated.

For example, urethane foam deposition can be deposited. Urethane foam can be fast curing, and can offer numerous benefits for printing (as compared to directly printing concrete), for instance in cure time, weight, and layer adhesion. With a cure time around 30 seconds and a density of 1.75 lb/ft$_3$, urethane foam can be deposited to create a building-scale printed object rapidly. Then, using conventional concrete, the urethane mold can be filled to create an insulated structural wall. This approach offers the benefits of speed, customizability, and low-cost for construction of buildings.

Alternately, the fabricator may extrude, spin or deposit tension elements (e.g., rope or cable). With tension elements, unique structures (e.g., bridges) can be wrapped, woven or strung around environmental features or previously printed materials.

The fabricator may deposit elements that bear purely compressive, tensile or bending loads, or that bear a combination of any two or more of these types of loads.

The fabricator has many advantages over conventional construction techniques. For example, structures can be conventionally built by the aid of large cranes which lift and hoist building elements into place for fastening to the groundwork. However, cranes would be poor 3D printing platforms due to the highly unconstrained motion of the swinging cable and a limited range of motion. In contrast, the fabricator provides a more stable platform for 3D positioning of objects and improved range and lifting capacity due to onboard parallel actuators. If actuators (e.g., linear actuators or winching motors) are onboard, the fabricator is capable of very fast deployment, in a matter of minutes, which can be useful for 3D printing structures for disaster relief and lifting/removing rubble.

Figure 2:
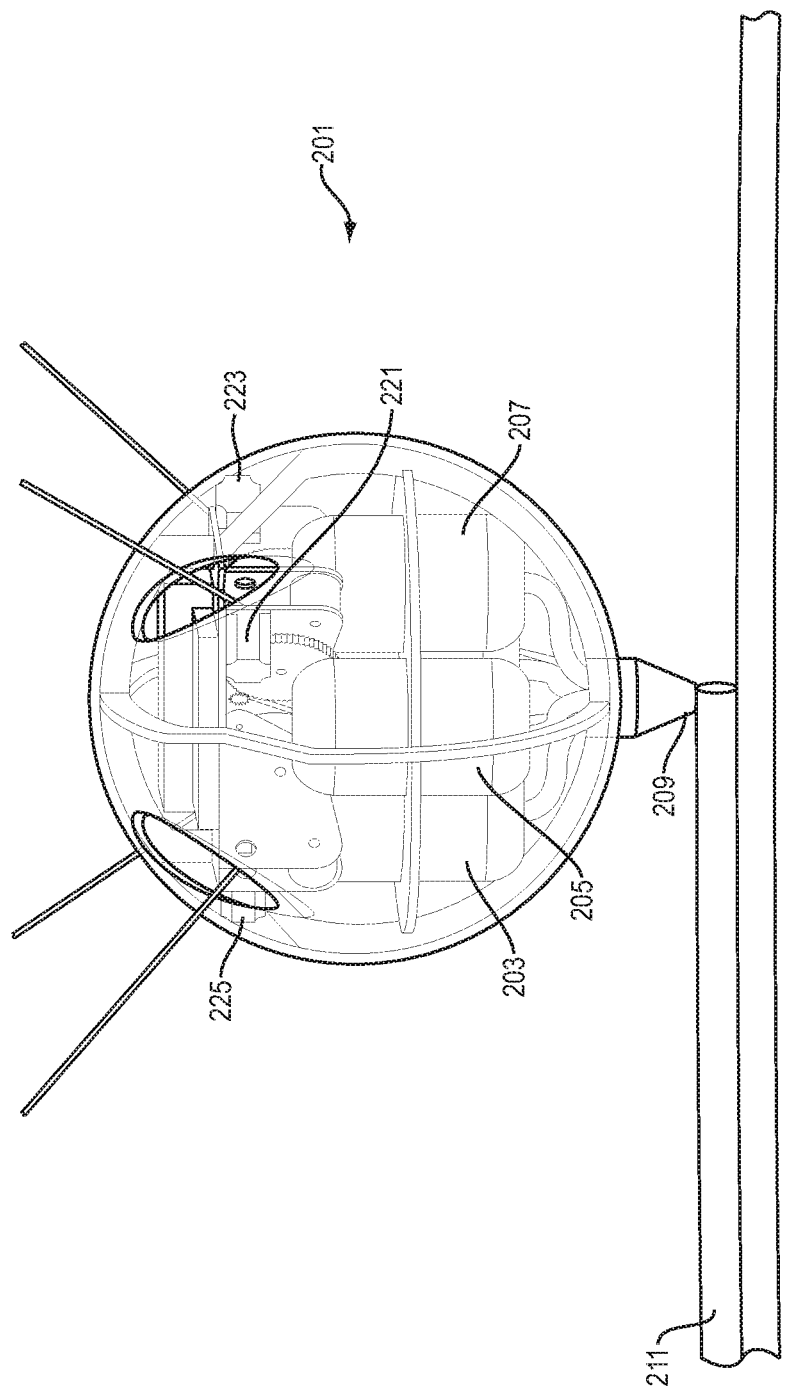
FIG. 2 shows a cross-sectional view of the fabricator.

The fabricator may comprise a semi or fully self-contained actuated robotic platform from which construction materials (e.g., expanding urethane foam, concrete, steel cables, etc.) can be accurately and precisely deposited into various positions or patterns in a large, building-sized volume. FIG. 2 shows a cross-sectional view of such a "self-contained" fabricator. In the example shown in FIG. 2, the fabricator 201 includes onboard reservoirs (e.g., 203, 205, 207) for storing material that is extruded through a nozzle 209 to deposit a layer 211 on the structure being constructed. The fabricator also includes onboard actuators (e.g., 221, 223, 225) for actuating motion of the fabricator throughout a 3D volume. For example, the onboard actuators (e.g., 221, 223, 225) may comprise winch motors for winding or unwinding cables that support the fabricator. Alternatively, the onboard actuators may comprise actuated prismatic joints or other linear actuators.

Figure 3:
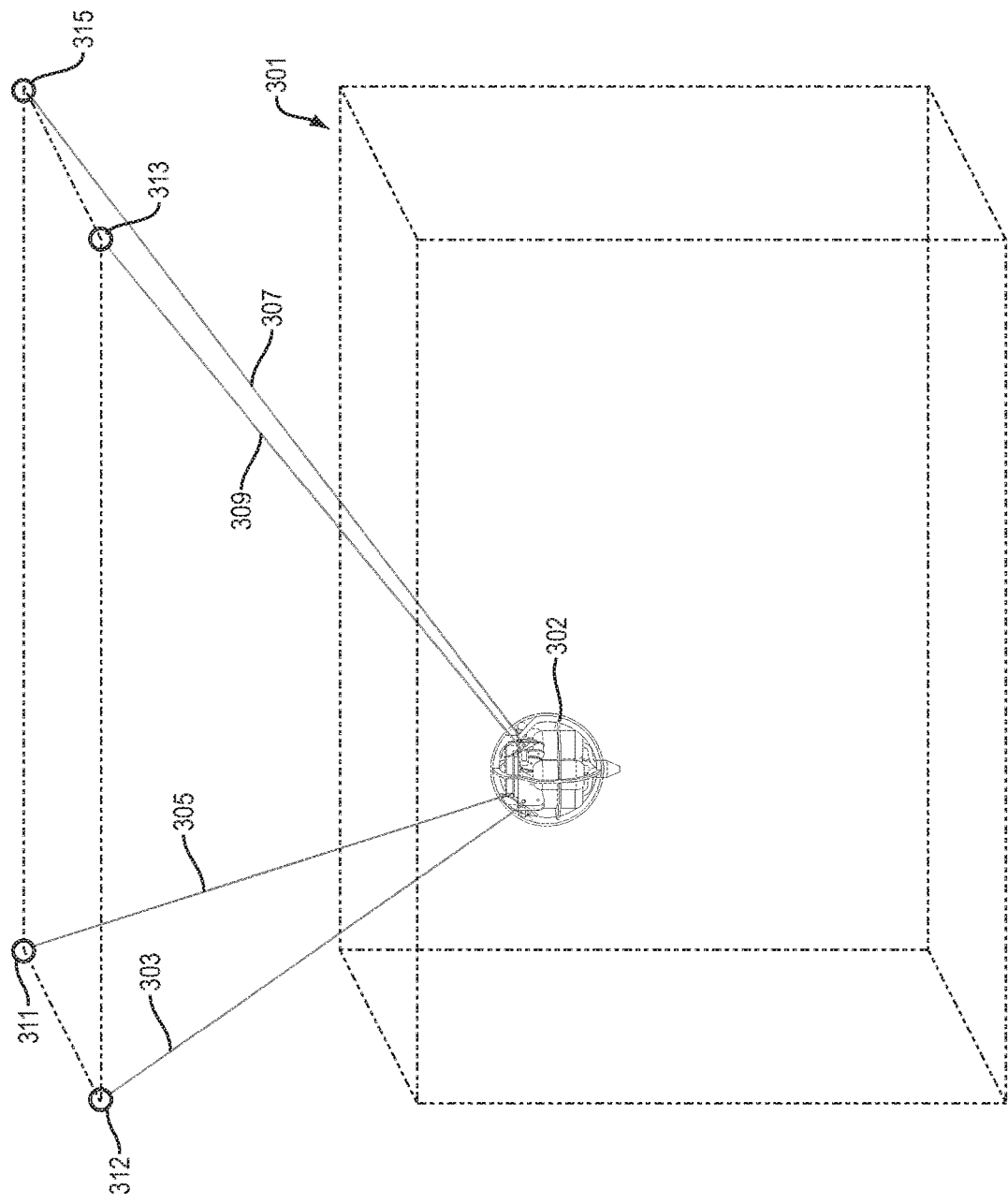
FIG. 3 shows a 3D working volume throughout which the fabricator may move.

FIG. 3 shows a 3D working volume 301 throughout which the fabricator 302 may move. The fabricator 302 is self-contained: i.e., includes (i) onboard actuators, (ii) reservoirs or other storage devices for storing the material to be deposited (or ingredient(s) used in producing the deposited material onboard the fabricator), (iii) onboard power and (iv) electronics for control and data processing. A material supply hose may be attached at some times in order to fill or refill the reservoir or other storage device.

Four supports (303, 305, 307, 309) support the fabricator 302 and are attached to repositionable anchors (e.g., 311, 312, 313, 315). The four supports may comprise tensile elements (e.g., cable) or rigid or semi-rigid arms. In any case, the onboard actuators can translate the fabricator along the length of the respective supports (e.g., by winding or unwinding cable, or by extending or retracting a rigid or semi-rigid arm). The fabricator 302 can translate itself to any x, y, z position within the 3D working volume 301. By moving to various positions within the 3D working volume, the fabricator 302 can position itself for depositing material in appropriate locations while 3D printing the structure.

Making the fabricator "self-contained" helps eliminate (or at least minimize) physical interference between the structure being built and the actuated fabricator Alternately, power, data and control signals may be provided wirelessly.

In some implementations, the fabricator deposits tensile elements, such as rope or cable, in order to build all or part of a tensile structure. For example, the tensile structure may comprise a web, net, cocoon, suspension bridge, cable-stayed truss, cable, tensegrity, or tensairity structure.

For example, the fabricator may spin and weave complex filament-based structures over a large volume. This is a technically challenging task that is ill suited to most traditional gantry CNC platforms. With the exception of high degree of freedom (six DOF or more) robotic arms, a traditional x, y, z actuation system can be too inflexible to build a webbed, latticed, cocoon-like, or bridge-like structure. Fabrication of such a structure necessitates large displacements and narrow access points due to the large volume and sparse but space-filling properties of the structure.

Figure 4:
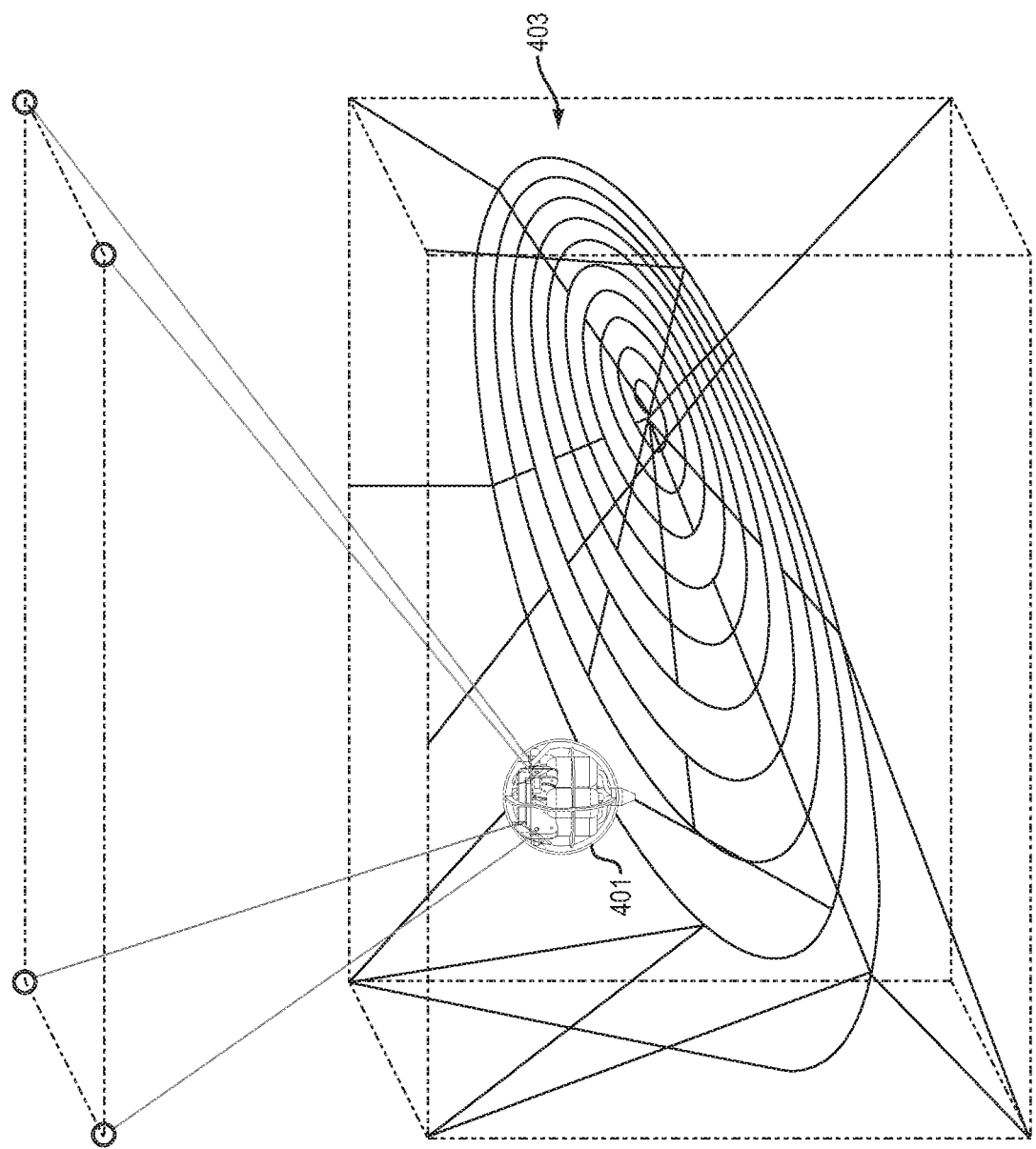
FIG. 4 show the fabricator producing a web-like tensile structure.

FIG. 4 shows the fabricator 401 producing a web-like tensile structure 403, by depositing material with a high tensile strength (e.g., with an ultimate tensile strength of least 25 M Pa).

In some implementations (in which the fabricator produces a tensile element), the fabricator applies a coating to filament as the filament is unwound from a spool. The coating comprises an adhesive or chemically setting material. Alternately, the filament on the spool may be pre-soaked with adhesive or chemically setting material. The coating causes the filament to adhere to itself (where the filament strand touches another part of the filament strand). Thus the web need not be knotted or woven (which is much more technically challenging).

Figure 5:
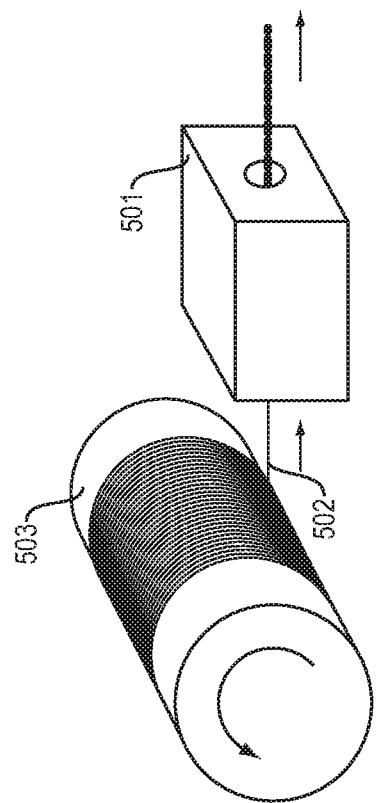
FIG. 5 shows an applicator for applying an adhesive coating to a filament.

FIG. 5 shows an applicator 501 for applying an adhesive (or chemically setting) coating to a filament 502. The filament is stored on a spool 503.

Figure 6:
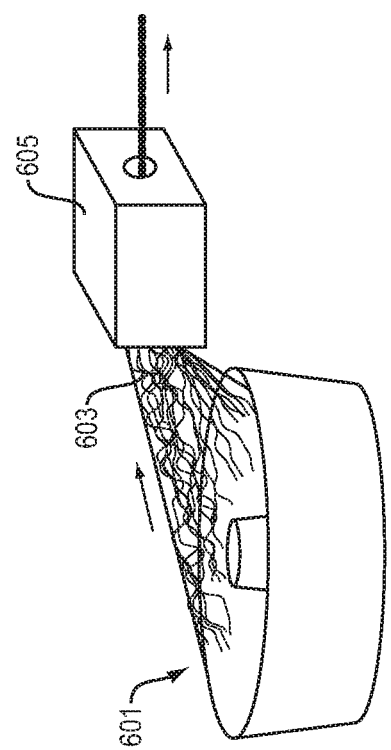
FIG. 6 shows apparatus for heating a material to its glass transition temperature, transforming the material into fibers, and then spinning the fibers.

In other implementations of this invention, the deposited material is heated to its glass transition temperature and spun to form long, thin fibers which are then wound or woven to form a tensile element (e.g., cable or rope). FIG. 6 shows apparatus for heating a material to its glass transition temperature, transforming the material into fibers, and then spinning the fibers. A heated, spinning sieve 601 spins the material into fibers 603. Another part of the apparatus 605 winds the fibers and outputs the tensile element.

Figure 7:
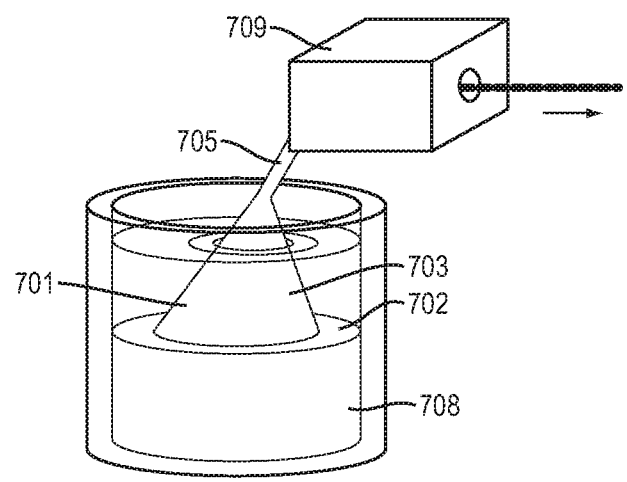
FIG. 7 shows apparatus for pulling film from a chemical reaction interface and then spinning the film into fiber.

FIG. 7 shows an alternate approach to producing the fiber, used in some implementations of this invention. A film 701 is generated at the interface 702 between two chemically reacting liquids (703, 708). The film is pulled from the interface at a rate such that the film continues to form and the film is drawn into a continuous fiber 705. An apparatus 709 dries out the fiber (and optionally winds it with other fibers) to give better bulk strength.

Figure 8:
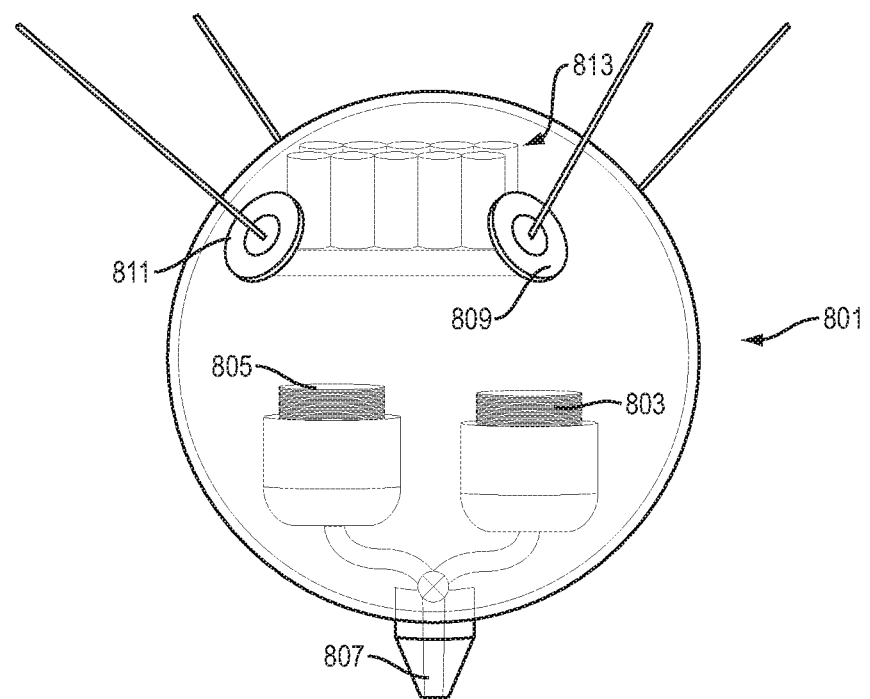
FIG. 8 shows a cross-section of a fabricator configured to spin fiber and to deposit the fiber as a tensile element.

FIG. 8 shows a cross-section of a fabricator 801 configured to actuate its own motion, to spin fiber and to deposit the fiber as a tensile element. The fabricator includes filament or adhesive spools 803, 805, a nozzle 807 for depositing a spun, braided or woven material, actuators (e.g., 809, 811), and batteries and electronics 813 for power and control.

In some implementations of this invention, a linear actuator fuses and unfuses strips of material to form an elongated hollow structure ("arm"). This linear actuator is sometimes referred to herein as a "fusion" actuator.

The "fusion" actuator includes a group of three or more tape-measure-like devices, each being configured for winding or unwinding a flat tape that is more flexible in one direction than in other directions (again, similar to a tape measure). The tape may be metal. Each of the tapes, when wound up, may comprise a spring under compression. The wound-up tapes are unspooled edge-to-edge in a radially symmetric pattern. As the tapes transition from a coiled state into a linear state, the edges of the tapes are fused to each other. The fusion occurs by: (i) melting fusible material positioned adjacent to the edges, and (ii) then cooling the fusible material while edges of neighboring tapes are adjacent to each other. The alloy hardens and binds the metal tapes together edge to edge, to form a hollow structure the exterior of which comprises the tapes and fusible material. In such a configuration, the uncoiled tapes support each other and can be used as a load bearing support. The actuator has spooling and high aspect ratio performance similar to a reel of rope or cable, but can support compressive/bending loads, unlike rope or cable.

In a prototype of this invention, the tapes comprise copper clad steel. The tapes have been coated on the inner edges with a thin layer of low-melting point solder alloy. The thin layer of solder is not very mobile and does not drip off the tape edges, even when the solder is molten. The solder layer, once applied to the inner bonding edges of a tape, does not need reapplication or removal. A potential issue is that (when the tape is being wound back up) the cooling solder might cause the strip to bond together in the reel, but this potential problem is avoided by using the cooling roller.

In an illustrative embodiment of this invention, the "fusion" actuator includes steel tapes, a fusible material, and thermoelectric heat pumps. The fusible material is used to coat the edges of the tapes, and to fuse the tapes after hardening. The thermoelectric heat pumps are reversible, and are used for heating (or cooling) the fusible material, in order (i) to bond the tapes at the edges, as the coiled tape is unwound, and (ii) to detach the tapes from each other, as the coiled tape is wound back up.

FIGS. 9-14 show a "fusion" actuator, in an illustrative embodiment of this invention. The actuator 901 is configured to increase the length of an elongated hollow structure by unwinding three tapes 903, 905, 907 and fusing the three tapes together with a fusible material to form a rigid hollow structure 909. It is also configured to reduce the length of the hollow structure by winding up and unfusing the three tapes.

Figure 9:
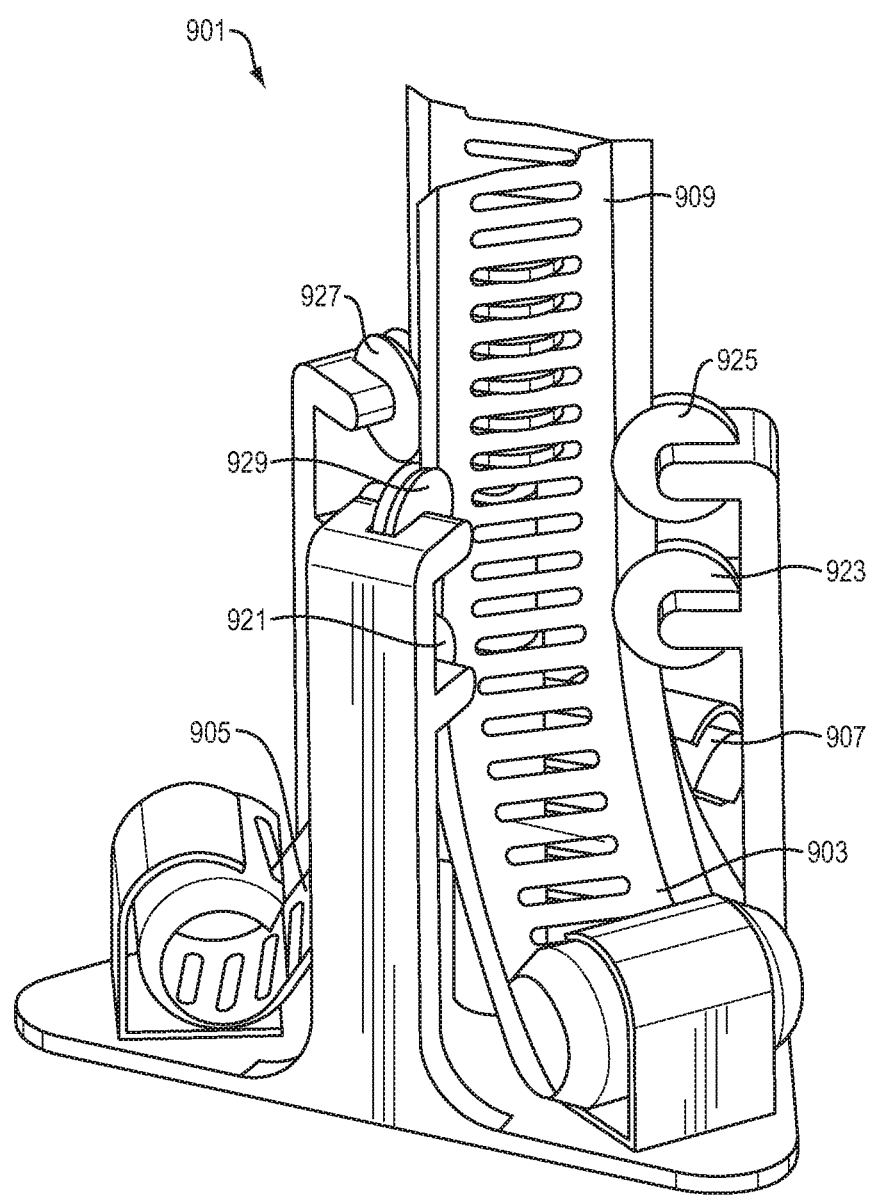
FIGS. 9, 10, 11, and 12A show a rotary-to-linear actuator. The linear actuator is configured to increase the length of an elongated hollow structure by unwinding three tapes and fusing the three tapes together with a fusible material to form the hollow structure. It is also configured to reduce the length of the hollow structure by winding up and unfusing the three tapes.

FIG. 9 shows rollers (e.g., 921, 923, 925, 927, 929) that are included in the actuator. The rollers are for fusing or unfusing the three tapes with a fusible material. The rollers include (or transmit heat to or from) thermoelectric junctions for heating or cooling the fusible material. As the tapes are being unwound, the lower rollers (e.g., 921, 923) heat the fusible material and the upper rollers (e.g., 925, 927, 929) cool the fusible material. In contrast, when the tapes are being wound up, the upper rollers (e.g., 925, 927, 929) heat the fusible material and the lower rollers (e.g., 921, 923) cool the fusible material.

Figure 10:
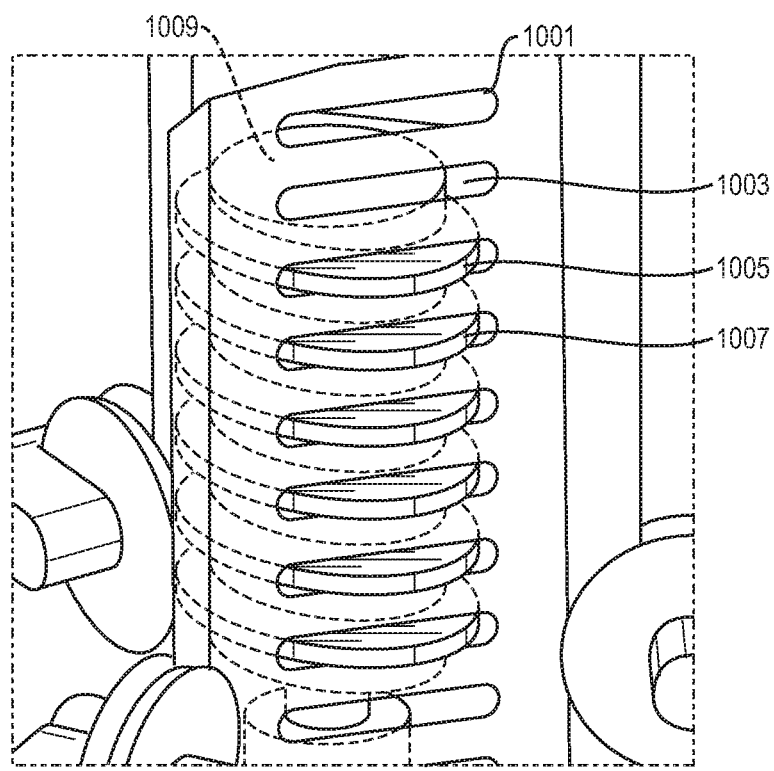

FIG. 10 shows slanted slots (e.g., 1001, 1003) in the tapes. The thread of the rotatable screw is configured to engage with (and partially fit into) the slanted slots (e.g., at 1005, 1007). As the screw 1009 rotates, the hollow structure increases or decreases in length, depending on the direction of rotation of the screw. An electric motor powers the screw rotation. Thus, the rotary motion of the motor and screw are transformed into linear motion of the tapes and the hollow structure.

Figure 11:
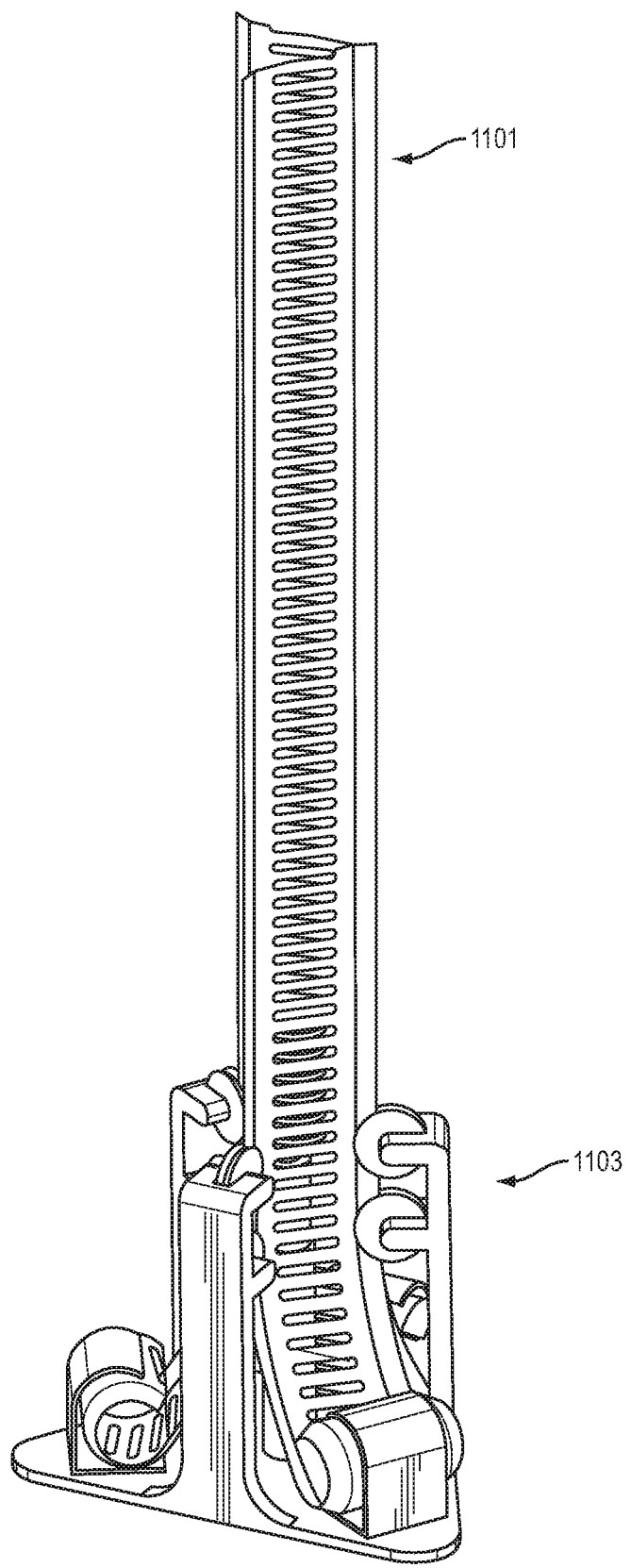

FIG. 11 shows an elongated hollow structure 1101 produced by the "fusion" actuator 1103.

In the example shown in FIGS. 9, 10 and 11, a large square toothed lead screw advances all three tapes simultaneously and at even rates. Alternately, the system can use independent motors for each spool of tape if a curved or otherwise non-linear output is desired (rolls could be dispensed at different rates, resulting in a curved structure). This uneven reeling can be achieved because the linking with the fusible material is continuous and does not rely on discrete locking elements such as zipper teeth.

Thus, in the fusible bonding technique, the bond between tapes need not be limited to making straight columns. The fusible bond technique allows the connection between adjoining tapes to be continuous and allows for curved structures to be made as well as straight columns to be made. (In contrast, if the tape attachment technique is a zipper or a tab-slot process, the unspooled shape can't change between actuation cycles as the zipper teeth are discrete.)

Figure 12A:
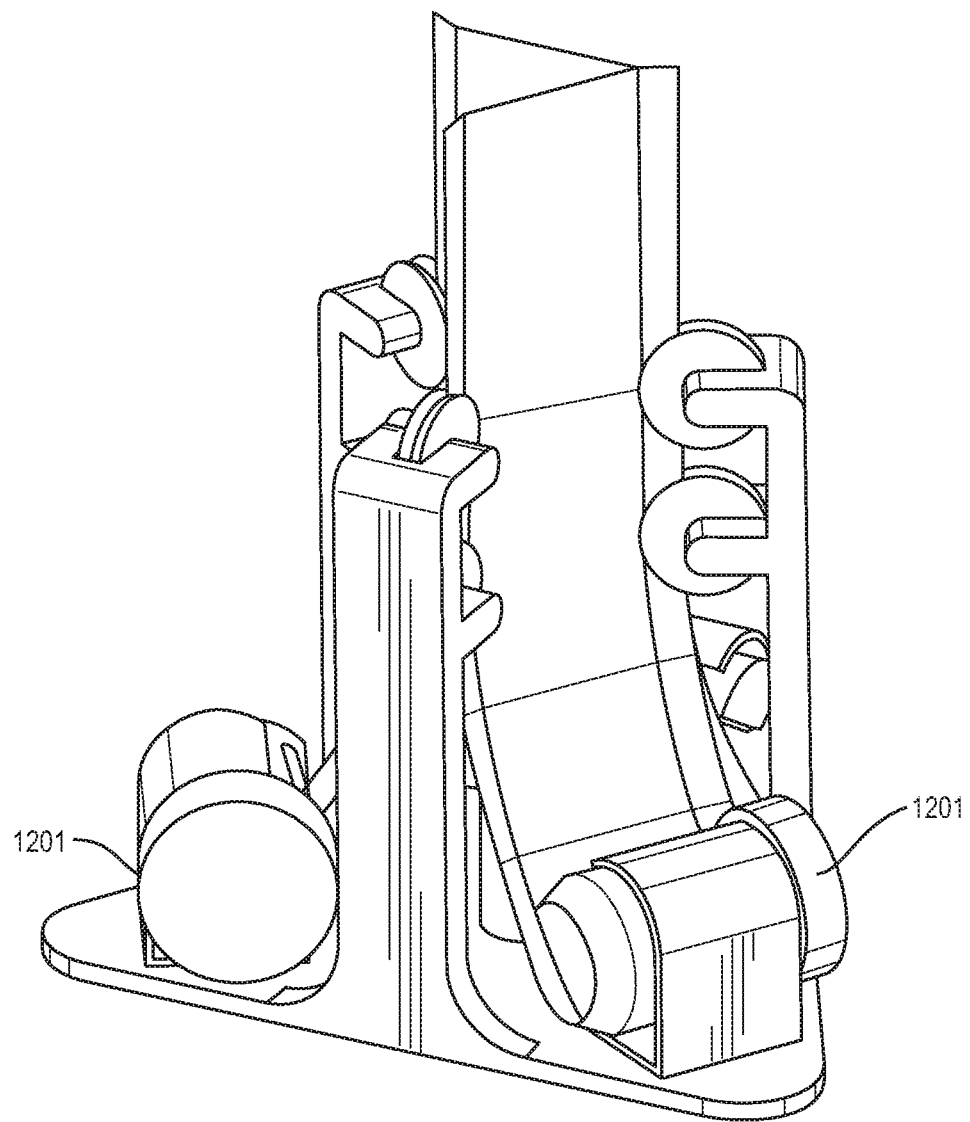
Figure 12B:
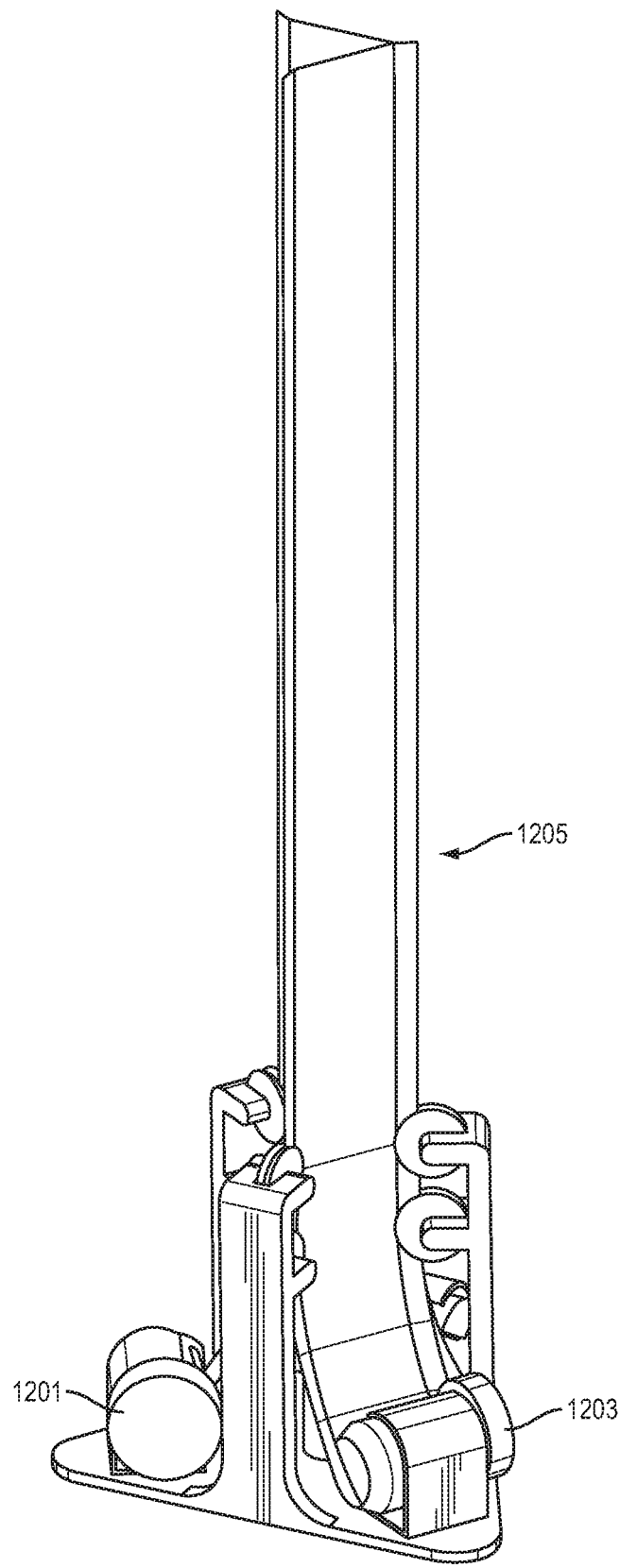
FIGS. 12B and 12C show a tall hollow structure produced by such an actuator.
Figure 12C:
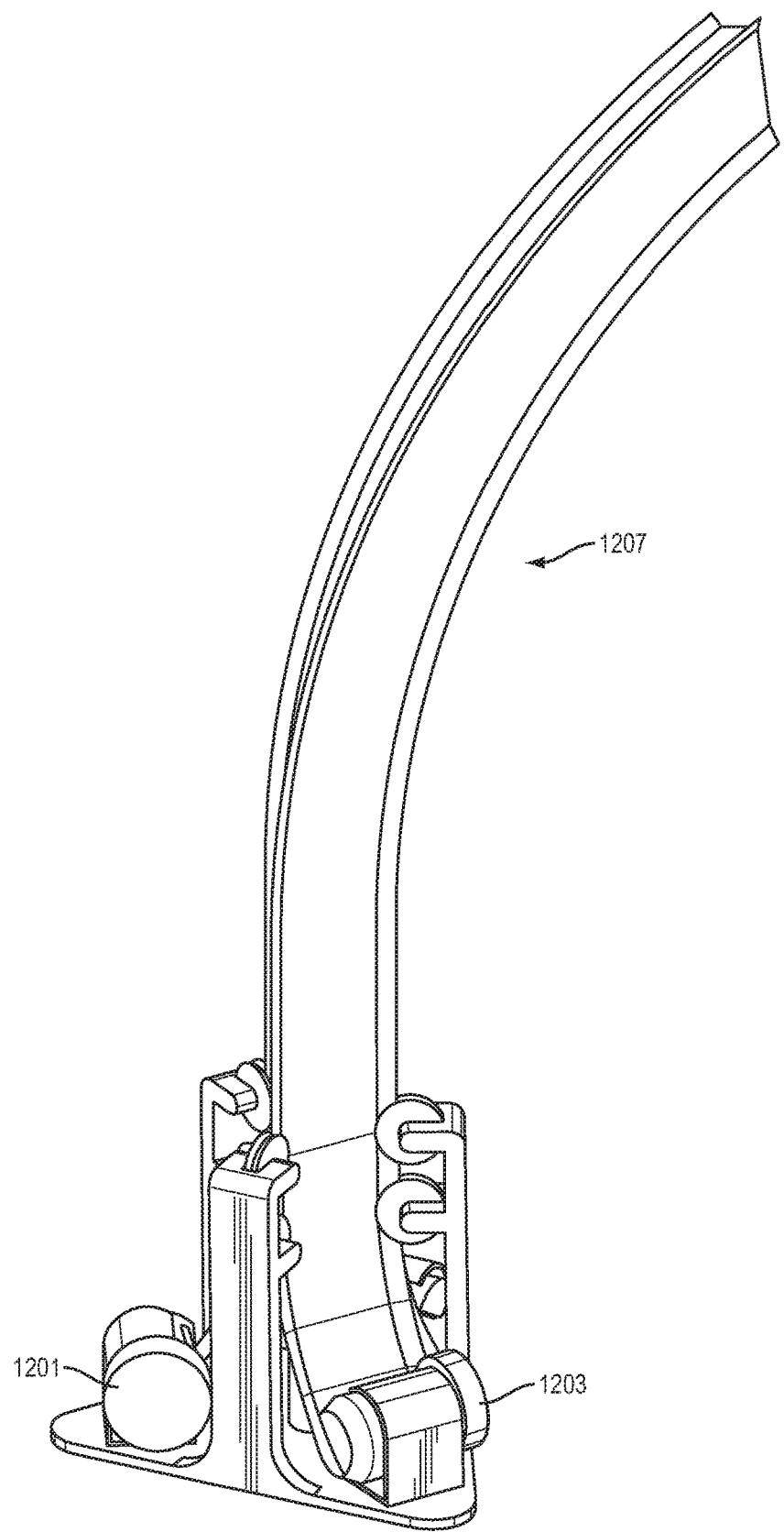

FIG. 12A shows an actuator with separate servo motors (e.g., 1201, 1203) for each of the three tapes. FIGS. 12B and 12C show a tall hollow structure produced by such an actuator. In FIG. 12B, the hollow structure 1205 is straight. In FIG. 12C, the hollow structure 1207 is curved.

Figure 13:
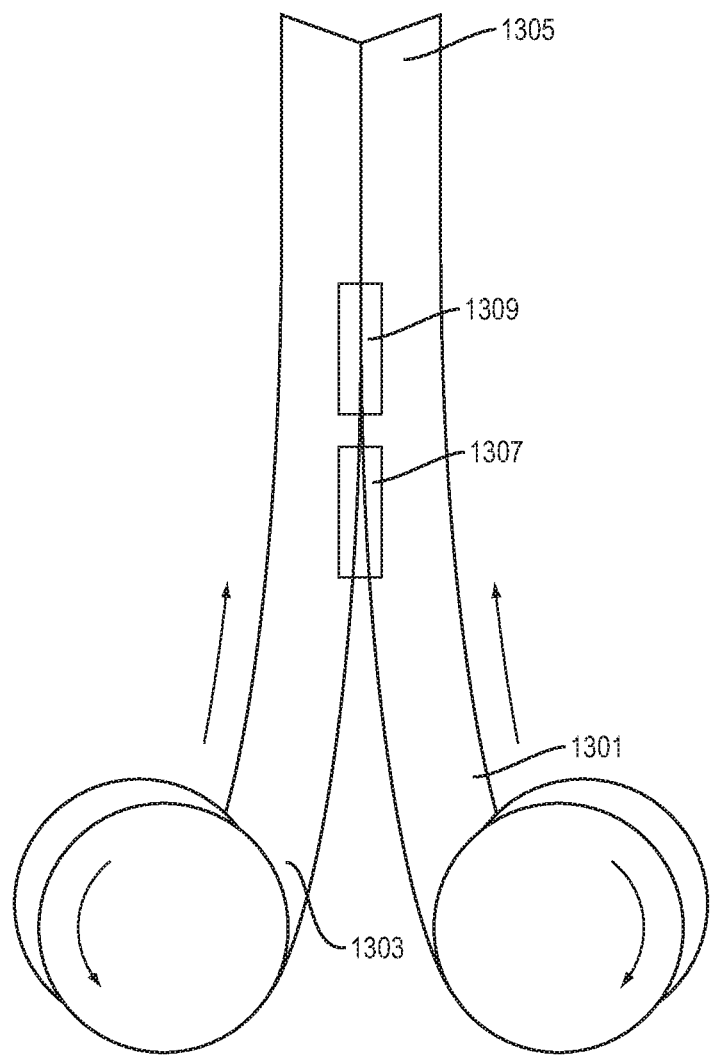
FIGS. 13 and 14 shows rollers with thermoelectric heat pumps. In the example shown in FIG. 13, the tapes are being unwound to increase the length of the hollow structure. In the example shown in FIG. 14, the tapes are being wound up to shorten the length of the hollow structure.
Figure 14:
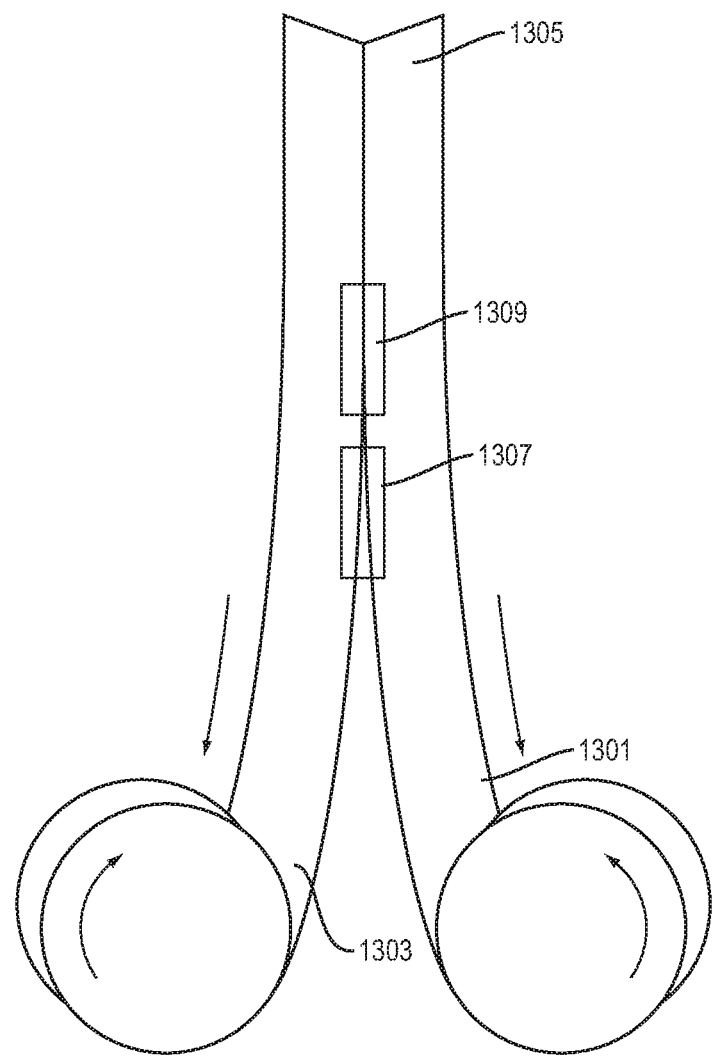

FIGS. 13 and 14 shows rollers with thermoelectric heat pumps. In the example shown in FIG. 13, the tapes (e.g., 1301, 1303) are being unwound to increase the length of the hollow structure 1305. The lower rollers (e.g., 1307) heat the fusible material and the upper rollers (e.g., 1309) cool the fusible material. In the example shown in FIG. 13, the tapes (e.g., 1301, 1303) are being wound up to shorten the length of the hollow structure 1305. The upper rollers (e.g., 1309) heat the fusible material and the lower rollers (e.g., 1307) cool the fusible material.

Figure 15:
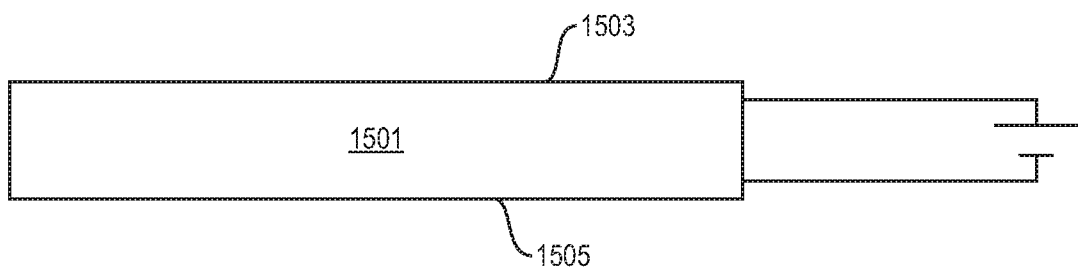
FIGS. 15 and 16 shows a thermoelectric heat pump for use in the actuator.
Figure 16:
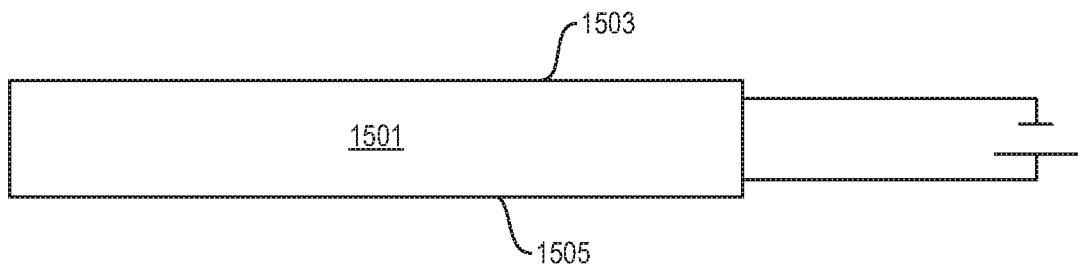

FIGS. 15 and 16 shows a thermoelectric heat pump 1501 for use in the linear actuator. In FIG. 15, heat is being pumped from a first side 1503 to a second side 1505 of the pump 1501. In FIG. 16, the DC current passing through the thermoelectric heat pump has been reversed, causing heat to be pumped in the reverse direction (from the second side 1505 to the first side 1503 of the pump 1501).

In FIG. 9, the tapes can be seen spooled up in storage canisters at the base of the system. The tapes are cut with a slanted slot pattern to allow them to engage with the lead screw. As the tapes advance (while they are being unwound from the storage canisters), they are heated at the edges by a parallel set of heating rollers (e.g. 921, 923), melting the low temperature fusible material coating the inside edges of the tape. The tape is then run through a subsequent set of cooling rollers (e.g., 925, 927, 929) to solidify the solder and firmly secure the edges of the tape together.

The heating and cooling slotted rollers each employ a thermoelectric heat pump, such as a Peltier device. In such a device, heat is pumped from one side of the device to the other by a driving electric current. This current can be reversed, which will reverse the flow of heat, allowing for easy trasformation of the cooling rollers to heated rollers and the heated rollers to cooled rollers.

As shown in FIG. 11, the rotary to linear "fusion" actuator is capable of very high aspect ratio behavior, extending many feet tall and collapsing to only a few inches in height.

When the "fusion" actuator is reeling back up, the hot and cold rollers can swap function by simply reversing the current flow to the Peltier thermoelectric device. When reversed, (i) the higher rollers heat the tapes, to re-melt the solder so that the tapes can be separated as they are reeled back into their canisters, and (ii) the lower rollers cool the tapes, to solidify the solder on the tape before the tape returns into the coil so as not to accidentally solder the entire coil shut.

The tapes can be made of a moderately thermally insulating material in order to limit the spread of the heat in the tapes. Steel and titanium are good choices, but steel is easier to obtain and electroplate with copper or tin to provide an attachment point for the solder coating. Titanium has a much higher thermal insulation factor and better flexural strength than steels, but is more expensive and may require a more exotic electroplating setup or simply physical vapor deposition of copper, gold or tin.

A wide variety of fusible materials may be used. For example, any metal alloy with a low melting temperature may be employed, including solder of any type or any other fusible alloy, including mercury-containing alloy, alkali metal-containing alloy, gallium-containing alloy, bismuth, lead, tin, cadmium, zinc, indium or thallium-containing alloy, Field's metal, or Rose metal. The fusible material may have a eutectic composition. Alternately, the fusible material may comprise a thermoplastic or any other material with a melting or glass transition temperature less than 500 degrees Celsius.

A robot with a "fusion" actuator can transport itself from one location to another. An example of such a robot is shown in FIGS. 17A, 17B, 17C, 17D. The actuators can extend or retract rigid or semi-rigid elongated structural members ("arms"). The robot has eight arms, which are equidistant from each other on the robot's spherical body 1701. In FIG. 17A, all of the arms are fully retracted. In FIG. 17B, one of the arms 1703 is extended. In FIG. 17C, the robot is supported by four of the arms 1705, 1706, 1707, 1709, and is reaching out with a fifth arm 1703. In FIG. 17D, the robot is supported by three arms 1705, 1707, 1709 and has lifted a fourth arm 1706 from the ground. Such a robot can locomote, by extending and retracting different arms. It can also reach out to grab an object.

A fabricator for 3D printing a large structure may employ linear actuators with extendable arms (e.g., "fusion" actuators). For example, ends of least some of the arms may be attached to (or grab) elevated anchor points. In that case, by shortening or extending different arms that are attached to (or are grabbing) the anchor points, the robot may move within a 3D volume. Alternately, some of the arms may extend below the object to touch the ground, while other arms are attached to (or grab) elevated anchor points. Alternately, none of the arms are attached to (or grab) fixed anchor points, and the fabricator moves from place to place by "walking" on its arms (extending and retracting different arms in order to locomote). Regardless of whether arms are connected to anchor points, the fabricator can use the arms to transport itself to points within a working volume, in order to deposit material at appropriate locations to make a structure.

This invention has many practical applications. For example, in some implementations, this invention can be used as a quickly deployable, large scale positioning system for building construction. Building contractors may use this device as a CNC (computer numerical control) tool for material deposition, or as a formative tool. Or, for example, this invention can be used in relief efforts for quickly fabricating small shelters or for clearing and removing fallen structural elements.

Definitions and Clarifications

Here are a few definitions and clarifications. As used herein:

The terms "a" and "an", when modifying a noun, do not imply that only one of the noun exists.

The word "coat" means to (at least partially) coat, infiltrate, penetrate or encapsulate.

The term "comprise" (and grammatical variations thereof) shall be construed broadly, as if followed by "without limitation". If A comprises B, then A includes B and may include other things.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "fusible material" shall be construed broadly. For example, "fusible material" includes any material with a melting temperature or glass transition temperature less than 500 degrees Celsius. Also, for example, "fusible material" includes any solder. Also, for example, "fusible material": includes any fusible alloy, including any mercury-containing alloy, alkali metal-containing alloy, gallium-containing alloy, bismuth, lead, tin, cadmium, zinc, indium or thallium-containing alloy, Field's metal, or Rose metal. Also, for example, "fusible material" includes any thermoplastic.

A "heating element" includes an artificial heat source that heats by one or more of conduction, convection, radiation or induction. Also, the term "heating element" includes: (1) a resistor or any other resistive heating element; (2) any other device that converts electricity into heat by ohmic heating; (3) a hot stamp press or any other apparatus for applying heat and pressure; (4) an oven; (5) an inductive heater; (6) an artificial source of electromagnetic radiation, including a heat lamp, an artificial infrared light source, a laser, or an artificial source of microwave radiation; and (7) any heat pump, including any Peltier device or other thermoelectric heat pump.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

The term "linear" shall be construed broadly, and includes curvilinear.

The term "melt" shall be construed broadly. To "melt" includes to melt or soften by the application of heat.

The term "or" is inclusive, not exclusive. For example "A or B" is true if A is true, or B is true, or both A or B are true. Also, for example, a calculation of "A or B" means a calculation of A, or a calculation of B, or a calculation of A and B.

A parenthesis is simply to make text easier to read, by indicating a grouping of words. A parenthesis does not mean that the parenthetical material is optional or can be ignored.

The term "soften" shall be construed broadly. To "soften" includes (1) to soften below a melting temperature and above a glass transition temperature, (2) to melt above a melting temperature, (3) to transition from a higher to a lower elastic modulus, (4) to transition from a higher to a lower viscosity, or (5) to otherwise soften.

The term "tape" shall be construed broadly. "Tape" includes any elongated strip. For example, the flexible metal strip in a tape measure comprises "tape".

"3D" means three-dimensional.

The term "3D printing" shall be construed broadly. For example, "3D printing" includes any additive fabrication process, in which successive layers of material are laid down in different shapes in accordance with a digital model.

A list of multiple steps in a process does not imply, except to the extent that the context requires otherwise, that: (1) the steps occur in any particular order or sequence, including the order or sequence listed; (2) the steps occur only once; (3) the different steps occur the same number of times during the process, or (4) a particular step is applied to the same thing each time that the particular step occurs (for example, except to the extent that the context requires otherwise, a specific step that is described as applying to "a layer" may apply to a different layers in a layered object each time that this specific step occurs). For purposes of this grammatical paragraph, "list" includes "description" or "describe".

Grammatical variations of defined terms shall be construed in like manner as the defined terms. For example, if a verb is defined in one conjugation, then other conjugations of that verb shall be construed in like manner. Or, for example, if a noun is defined in one declension, then other declensions of that noun shall be construed in like manner. Or for example, the adjective "molten" shall be construed in like manner as the defined verb "melt". Or, for example, the adjective "softened" shall be construed in like manner as the defined verb "soften".

Variations:

This invention may be implemented in many different ways. Here are some non-limiting examples.

In a "fusion" actuator: A wide range of materials may be used for tapes. For example, the tape may comprise metal or plastic. When the tapes are separated from each other, the tapes may be coiled, wound, or spooled. Alternately, the tapes may be stored in folded layers or other configurations, including at least partially in a straight line or curved line. The hollow structure formed by the tapes may vary in rigidity and ability to bear compressive, tensile or bending loads.

A "fusion" actuator is not limited to use in fabricators. Rather, a "fusion" fabricator may be used in any context.

In a fabricator: The deposited material does not need to be dispensed through a nozzle, but rather may be dispensed through any output mechanism. The fabricator may be controlled by onboard processors, external processors, or a combination of the two. The material deposited by the fabricator may comprise a building material itself (e.g. concrete) or material used to form a mold. After use as a mold, the mold material may be removed or may be retained as part of the structure being built.

This invention may be implemented as a method comprising, in combination: (a) forming or lengthening an elongated hollow structure by translating tapes through an apparatus that (i) moves the tapes closer to each other, (ii) melts fusible material, and (iii) keeps edges of neighboring tapes adjacent to each other while the fusible material cools, hardens and fuses the neighboring tapes together at the edges; and (b) shortening or dismantling the hollow structure by translating the tapes through the apparatus as the apparatus: (i) melts the fusible material, and (ii) moves the edges of neighboring tapes apart from each other. Furthermore: (1) the tapes may be translated at speeds that are not uniform from tape to tape and the elongated hollow structure may be curvilinear; (2) the elongated hollow structure may be configured to bear compressive loads; (3) reversible heat pumps may be used to heat or cool the fusible material; (4) (i) while the hollow structure is lengthening, a first set of heat pumps, out of a plurality of heat pumps, may be used to melt the fusible material and a second set of heat pumps, out the plurality, may be used to cool the fusible material, and (ii) while the hollow structure is shortening, the second set of heat pumps may be used to heat the fusible material and the first set of heat pumps may be used to cool the fusible material; (5) (i) the tapes may be penetrated by slots, (ii) threads of a shaft may engage the slots; and (iii) rotation of the shaft may drive linear movement of the tapes relative to the shaft; (6) (i) a plurality of actuators each respectively, may perform the lengthening and shortening. (ii) the plurality of actuators may be located onboard a fabricator, and (iii) the method may further comprise the fabricator translating itself relative to a point in the Earth by shortening or lengthening hollow structures in different actuators, respectively, out of the plurality of actuators; (7) at least some of the hollow structures may be anchored to positions above the fabricator; (8) the hollow structures may be arranged so that none of the hollow structures are anchored to a fixed position in the environment; (9) the fabricator may be configured to deposit materials to form tensile structural elements; and (10) the fabricator may be configured to deposit materials to help construct a structure.

This invention may be implemented as apparatus comprising, in combination: (a) one or more actuators, each of the one or more actuators being configured for actuating linear motion of at least one tape out of a plurality of tapes; (b) one or more heat sources for melting fusible material; (c) one or more guidance mechanisms for guiding the tapes, as the tapes undergo the linear motion, into a configuration in which edges of neighboring tapes are adjacent to each other during a time in which the fusible material cools and hardens to join the neighboring tapes at the edges; wherein (A) the tapes, when joined by the fusible material, form or lengthen a hollow structure, and (B) the walls of the hollow structure comprise the tapes and the fusible material. Furthermore: (1) the apparatus may be further configured for (i) shortening or dismantling the hollow structure by melting fusible material adjacent to edges of the tapes and (ii) moving the edges apart from each other; (2) at least one of the one or more heat sources may comprise a thermoelectric heat pump; (3) the apparatus may further comprise one or more partial or complete cylinders, each being configured for positioning at least part of one of the plurality of tapes in a coiled or wound configuration.

This invention may be implemented as an actuated fabricator wherein: (a) the fabricator is configured to deposit tensile structural elements in a 3D pattern; (b) the fabricator is configured to be supported by at least three elongated support members; (c) the fabricator includes a plurality of onboard actuators, each of the actuators respectively being configured for actuating linear translation of the fabricator relative to an end of one of the elongated support structures; and (d) the fabricator is configured, by actuating different translations along different support members out of the at least three support members, to translate itself throughout a 3D volume. Furthermore: (1) the actuated fabricator may be configured to store onboard the fabricator (i) material to be deposited as the tensile elements or (ii) ingredients used for producing the material onboard the fabricator; (2) the actuated fabricator may be configured to output a tensile element that is coated with an adhesive or setting material that causes different portions of the tensile element which come into contact with each other to stick to each other; (3) the actuated fabricator may be configured to heat material and spin the material into fibers that comprise the tensile elements; and (4) the actuated fabricator may be configured to pull film from an interface between two chemically reacting liquids and to form the film into a filament.

CONCLUSION

It is to be understood that the methods and apparatus that are described herein are merely illustrative applications of the principles of the invention. Numerous modifications may be made by those skilled in the art without departing from the scope of the invention.

What is claimed is:

1. A method comprising, in combination:
   (a) actuating linear motion of at least one tape out of a plurality of tapes;
   (b) melting fusible material; and
   (c) guiding the tapes, as the tapes undergo the linear motion, into a configuration in which edges of neighboring tapes are adjacent to each other during a time in which the fusible material cools and hardens to join neighboring tapes at the edges;
   wherein
   (i) the tapes, when joined by the fusible material, comprise walls of a hollow structure, and
   (iii) the method further comprises shortening or dismantling the hollow structure by
      (A) melting fusible material adjacent to the edges, and
      (B) moving the edges apart from each other.

2. The method of claim 1, wherein the tapes comprise copper-clad steel.

3. The method of claim 1, wherein the melting is caused by heat from one or more thermoelectric heat pumps.

4. The method of claim 3, wherein each of the one or more thermoelectric heat pumps comprises a Peltier device.

5. The method of claim 1, wherein the method further comprises rotating a screw while a thread of the screw engages slots in the tapes, such that, as the screw undergoes rotation, the hollow structure increases or decreases in length, depending on the direction of rotation of the screw.

6. The method of claim 5, wherein the rotation of the screw causes the tapes to move simultaneously such that each tape is moving at a speed equal to that of each other tape.

7. The method of claim 6, wherein:
   (a) the hollow structure is elongated along a longitudinal axis; and
   (b) the axis is straight.

8. The method of claim 1, wherein a separate actuator actuates each of the tapes, respectively, causing the tapes to move simultaneously such that each tape is moving at a speed that is different than that of each other tape.

9. The method of claim 7, wherein edges of the hollow structure are curved.

10. The method of claim 1, wherein:
    (a) a first set of rollers heat the fusible material to cause the fusible material to melt; and
    (b) a second set of rollers cool the fusible material to solidify the fusible material.

11. The method of claim 1, wherein the tapes comprise titanium.

12. The method of claim 1, wherein the fusible material comprises solder.

13. The method of claim 1, wherein the fusible material comprises an alloy.

14. The method of claim 1, wherein the fusible material comprises a thermoplastic.

15. A method comprising, in combination:
(a) actuating linear motion of at least one tape out of a plurality of tapes;
(b) melting fusible material; and
(c) guiding the tapes, as the tapes undergo the linear motion, into a configuration in which edges of neighboring tapes are adjacent to each other during a time in which the fusible material cools and hardens to join neighboring tapes at the edges;
wherein
(i) the tapes, when joined by the fusible material, comprise walls of a hollow structure, and
(ii) the melting is caused by heat from one or more thermoelectric heat pumps.

16. The method of claim 15, wherein the method further comprises rotating a screw while a thread of the screw engages slots in the tapes, such that, as the screw undergoes rotation, the hollow structure increases or decreases in length, depending on the direction of rotation of the screw.

17. The method of claim 16, wherein the rotation of the screw causes the tapes to move simultaneously such that each tape is moving at a speed equal to that of each other tape.

18. The method of claim 15, wherein a separate actuator actuates each of the tapes, respectively, causing the tapes to move simultaneously such that each tape is moving at a speed that is different than that of each other tape.

19. The method of claim 18, wherein edges of the hollow structure are curved.

20. The method of claim 15, wherein the tapes comprise copper-clad steel.

* * * * *